(12) United States Patent
Koyama

(10) Patent No.: US 8,573,781 B2
(45) Date of Patent: Nov. 5, 2013

(54) PROJECTOR AND CONTROL METHOD FOR THE SAME

(75) Inventor: Takaaki Koyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1279 days.

(21) Appl. No.: 12/187,558

(22) Filed: Aug. 7, 2008

(65) Prior Publication Data

US 2009/0109350 A1 Apr. 30, 2009

(30) Foreign Application Priority Data

Oct. 30, 2007 (JP) .................................. 2007-281156
May 22, 2008 (JP) .................................. 2008-134101

(51) Int. Cl.
*G03B 21/20* (2006.01)

(52) U.S. Cl.
USPC ............. 353/85; 348/759; 348/744; 386/358; 386/359; 353/100; 353/119

(58) Field of Classification Search
USPC ............. 348/759, 744; 386/358–359; 353/85, 353/100, 119
See application file for complete search history.

(56) References Cited

U.S. PATENT DOCUMENTS

| 7,104,656 | B2 * | 9/2006 | Dwyer et al. | ................. 353/119 |
| 7,607,785 | B2 * | 10/2009 | Sato | ................. 353/97 |
| 7,665,854 | B2 * | 2/2010 | Sugiura | ................. 353/119 |
| 7,677,739 | B2 * | 3/2010 | Kuroda | ................. 353/88 |

FOREIGN PATENT DOCUMENTS

| JP | A-2001-249402 | 9/2001 |
| JP | A-2002-025235 | 1/2002 |
| JP | A-2005-099617 | 4/2005 |
| JP | A-2005-326646 | 11/2005 |
| JP | A-2007-171885 | 7/2007 |
| JP | A-2007-240551 | 9/2007 |

* cited by examiner

*Primary Examiner* — Pankaj Kumar
*Assistant Examiner* — Charles N Hicks
(74) *Attorney, Agent, or Firm* — Oliff & Berridge, PLC

(57) ABSTRACT

A projector that includes: a light source; a light-on/off unit that turns on or off the light source; a recording medium reproduction unit that reproduces information recorded on a recording medium, and outputs a video signal; a video signal processing section that converts the video signal provided by the recording medium reproduction unit, and generates a projection-video-use video signal; a light modulation unit that modulates a light coming from the light source based on the video signal generated by the video signal processing section, and emits a resulting video light; a projection system that includes a projection lens, and magnifies and projects the video light coming from the light modulation unit; a lens cover that opens and closes the front of the projection lens; a lens cover open/close detection sensor that detects an open/close state of the lens cover; and a control section that at least controls operation of the light-on/off unit and that of the recording medium reproduction unit. In the projector, the control section turns off the light source, and interrupts reproduction by the recording medium reproduction unit when the lens cover open/close detection sensor detects a state change of the lens cover from open to close, and turns on the light source, and starts reproduction by the recording medium reproduction unit in accordance with predetermined requirements when the lens cover open/close detection sensor detects a state change of the lens cover from close to open.

14 Claims, 10 Drawing Sheets

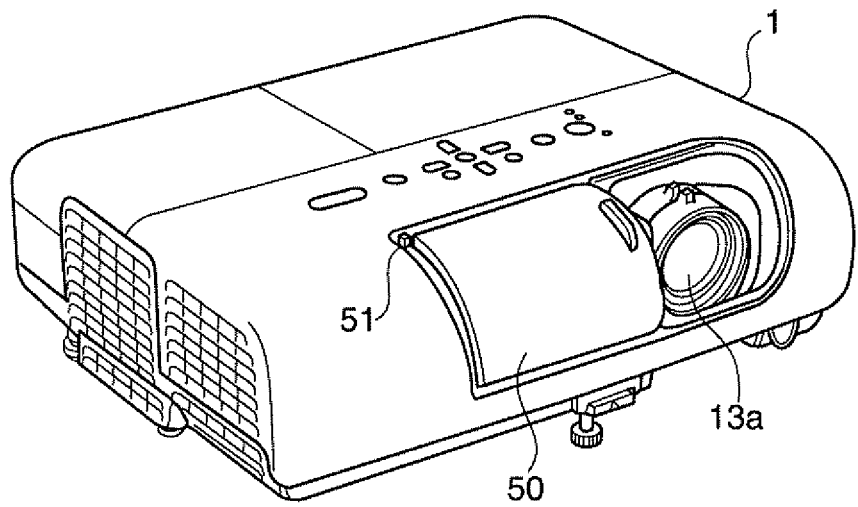
FIG. 2A LENS COVER OPENED
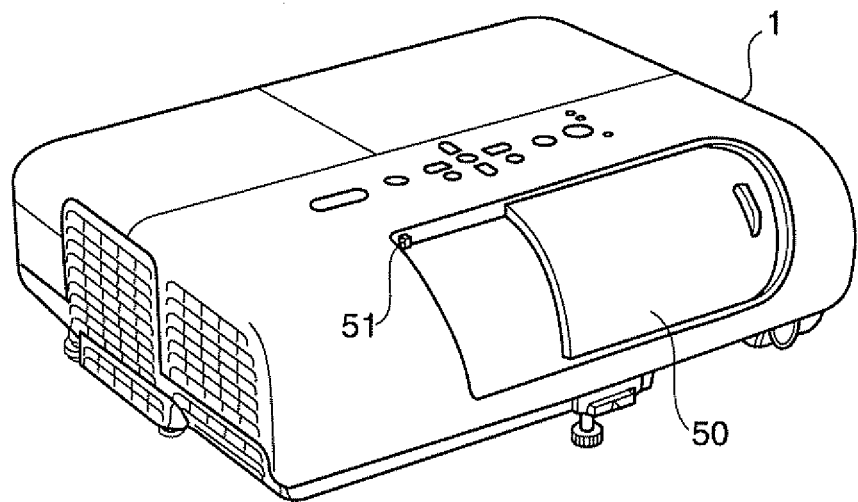
FIG. 2B LENS COVER CLOSED

PROJECTOR AND CONTROL METHOD FOR THE SAME

BACKGROUND

1. Technical Field

The present invention relates to a projector and a control method therefor and, more specifically, to a projector provided with a recording medium reproduction unit, and a control method for such a projector.

2. Related Art

A previous projector includes the one proposed in Patent Document 1 (JP-2005-99617; refer to paragraph 0019 and FIG. 1), for example, i.e., "A DVD reproduction section 3 is formed with an insertion port 3a to allow attachment of, through insertion, a recording medium D being a DVD and reproduction/recording from/to the DVD . . . . An image reproduced by the DVD reproduction section 3 is directed from a projection lens section 2b for projection onto a screen or others".

Patent Document 2 (JP-A-2007-171885; refer to Abstract) also proposes a previous projector, for example, i.e., "The open/close state of a shutter 5 is forwarded to a control section 11 as an ON/OFF-state signal for a mechanical switch 21, and when detecting that the shutter 5 is closed, the control section 11 turns off a lamp 6 so that a cool-down operation is started. When the cool-down operation is ended, an electronic switch 22 is turned off so that a supply from an AC power supply 8 is stopped".

A previous information reproduction device includes the one proposed in Patent Document 3 (JP-A-2002-25235; refer to claim 1), for example, i.e., "when a reproduction operation is interrupted, a reproduction position at the time of interruption is acquired, and based on thus acquired information, address information needed for a special reproduction operation during the next reproduction is acquired. Thus acquired address information is stored in a nonvolatile memory, and when a command comes for reproduction of the same optical disk, the special reproduction operation is executed based on the address information stored in the nonvolatile memory. After such a special reproduction operation, any normal reproduction is performed, i.e., a reproduction resume method in a previous information reproduction device".

In such previous projectors provided with a recording medium reproduction unit reproducing any information recorded on a recording medium such as DVD (Digital Versatile Disc), for example, an operation key (button) has been used for an operation related to reproduction by the recording medium reproduction unit. When there is no need for video projection, a lens cover is used to close the front of a projection lens for the purpose of protecting the projection lens from dust and damage.

The problem with such a projector is that when reproduction of a recording medium is interrupted (including when paused and stopped, and including due to power off) and no video projection is performed, there needs to go through two operations separately, i.e., an operation related to interruption of reproduction by the recording medium reproduction unit, and an operation of closing the projection lens by the lens cover. For resuming reproduction of the recording medium for video projection, there also needs to go through two operations separately, i.e., an operation of opening the lens cover, and an operation related to reproduction by the recording medium reproduction unit. As such, the complexity of operations has been a problem.

Moreover, when no video projection is performed, in addition to the operations described above, a lamp being a light source for video lights to be projected has to be tuned off, and for resuming video projection, in addition to the operations described above, the lamp has to be turned on, thereby resulting in a problem of the complexity of operations.

SUMMARY

An advantage of some aspects of the invention is to provide a projector that can improve the operational convenience when a user interrupts or resumes reproduction of a recording medium, and an operation method for such a projector.

A first aspect of the invention is directed to a projector that includes: a light source; a light-on/off unit that turns on or off the light source; a recording medium reproduction unit that reproduces information recorded on a recording medium, and outputs a video signal; a video signal processing section that converts the video signal provided by the recording medium reproduction unit, and generates a projection-video-use video signal; a light modulation unit that modulates a light coming from the light source based on the video signal generated by the video signal processing section, and emits a resulting video light; a projection system that includes a projection lens, and magnifies and projects the video light coming from the light modulation unit; a lens cover that opens and closes the front of the projection lens; a lens cover open/close detection sensor that detects an open/close state of the lens cover; and a control section that at least controls operation of the light-on/off unit and that of the recording medium reproduction unit. In the projector, the control section turns off the light source, and interrupts reproduction by the recording medium reproduction unit when the lens cover open/close detection sensor detects a state change of the lens cover from open to close, and turns on the light source, and starts reproduction by the recording medium reproduction unit in accordance with predetermined requirements when the lens cover open/close detection sensor detects a state change of the lens cover from close to open. Herein, when reproduction by the recording medium reproduction unit is paused, stopped, or interrupted by power off, such a state is collectively referred to as "interruption of reproduction". The light source is exemplified by a lamp, a light-emitting diode, and a laser diode.

In the projector of the first aspect of the invention, when the lens cover open/close detection sensor detects a state change of the lens cover from open to close, the light source is turned off, and reproduction by the recording medium reproduction unit is interrupted. When the lens cover open/close detection sensor detects a state change of the lens cover from close to open, the light source is turned on, and reproduction by the recording medium reproduction unit is started in accordance with predetermined requirements. This thus favorably eliminates any complicated operation for turning on or off the light source, and for interrupting or starting again reproduction by the recording medium reproduction unit, thereby improving the operational convenience.

A second aspect of the invention is directed to a projector, that includes: a recording medium reproduction unit that reproduces information recorded on a recording medium, and outputs a video signal; a video signal processing section that converts the video signal provided by the recording medium reproduction unit, and generates a projection-video-use video signal; a light modulation unit that modulates a light coming from a light source based on the video signal generated by the video signal processing section, and emits a resulting video light; a projection system that includes a projection lens, and magnifies and projects the video light coming from the light modulation unit; a lens cover that opens and closes the front of the projection lens; a lens cover open/close detection sensor that detects an open/close state of the lens cover; and a control section that at least controls operation of the recording medium reproduction unit. In the projector, the control section interrupts reproduction by the recording medium reproduction unit when the lens cover open/close detection sensor detects a state change of the lens cover from open to close, and starts reproduction by the recording medium reproduction unit in accordance with predetermined requirements when the lens cover open/close detection sensor detects a state change of the lens cover from close to open.

In the projector of the second aspect of the invention, when the lens cover open/close detection sensor detects a state change of the lens cover from open to close, reproduction by the recording medium reproduction unit is interrupted, and when the lens cover open/close detection sensor detects a state change of the lens cover from close to open, reproduction by the recording medium reproduction unit is started in accordance with predetermined requirements. This thus favorably eliminates any complicated operation for interrupting or starting again reproduction by the recording medium reproduction unit, thereby improving the operational convenience.

In a third aspect of the invention, in the projector of the second aspect, a light source and a light-on/off unit turning on or off the light source are further provided. In the projector, the control section turns off the light source when the lens cover open/close detection sensor detects the state change of the lens cover from open to close, and turns on the light source when the lens cover open/close detection sensor detects the state change of the lens cover from close to open.

In the projector of the third aspect of the invention, when the lens cover open/close detection sensor detects a state change of the lens cover from open to close, the light source is turned off, and when the lens cover open/close detection sensor detects a state change of the lens cover from close to open, the light source is turned on. This thus favorably eliminates any complicated operation for turning on or off the light source, thereby improving the operational convenience.

In a fourth aspect of the invention, in the projector of the second aspect, a light source and a light-on/off unit controlling an amount of a light of the light source are further provided. In the projector, the control section reduces the amount of the light of the light source when the lens cover open/close detection sensor detects the state change of the lens cover from open to close, and increases the amount of the light of the light source when the lens cover open/close detection sensor detects the state change of the lens cover from close to open.

In the projector of the fourth aspect of the invention, when the lens cover open/close detection sensor detects a state change of the lens cover from open to close, the amount of light of the light source is reduced, and when the lens cover open/close detection sensor detects a state change of the lens cover from close to open, the amount of light of the light source is increased. Accordingly, when the lens cover is opened, the amount of light of the light source can be increased in a short time.

In a fifth aspect of the invention, in the projector of the second aspect, the control section makes, when the lens cover open/close detection sensor detects the state change of the lens cover from open to close, the light modulation unit modulate the light from the light source in such a manner that an amount of the light from the projection system falls below a predetermined value, and makes, when the lens cover open/close detection sensor detects the state change of the lens cover from close to open, the light modulation unit modulate the light from the light source based on the video signal.

In the projector of the fifth aspect of the invention, when the lens cover open/close detection sensor detects a state change of the lens cover from open to close, the amount of light coming from the projection system is made to fall below a predetermined value. When the lens cover open/close detection sensor detects a state change of the lens cover from close to open, a video light as a result of modulation based on a video signal is emitted. Accordingly, when the lens cover is closed, the amount of light from the light source can be reduced for exposure to the lens cover, thereby preventing the lens cover from being excessively heated.

In a sixth aspect of the invention, in the projector of any of the first to fifth aspects, the control section interrupts, by a pause, reproduction by the recording medium reproduction unit when the lens cover open/close detection sensor detects the state change of the lens cover from open to close, and cancels the pause when the lens cover open/close detection sensor detects the state change of the lens cover from close to open, and starts reproduction by the recording medium reproduction unit.

In the projector of the sixth aspect of the invention, the open/close state of the lens cover is used as a basis to pause reproduction by the recording medium reproduction unit or clear the pause, thereby enabling, with no complicated operation, to start again reproduction from the point at which reproduction was paused last time.

In a seventh aspect of the invention, in the projector of any of the first to fifth aspects, the recording medium reproduction unit has a reproduction resume function. In the projector, the control section stops (including power off) reproduction by the recording medium reproduction unit when the lens cover open/close detection sensor detects the state change of the lens cover from open to close, and resumes reproduction by the recording medium reproduction unit when the lens cover open/close detection sensor detects the state change of the lens cover from close to open.

In the projector of the seventh aspect of the invention, the open/close state of the lens cover is used as a basis to stop reproduction by the recording medium reproduction unit or resume reproduction thereby so that, with no complicated operation, reproduction can be resumed from the point at which reproduction was stopped last time.

In an eighth aspect of the invention, in the projector of any of the first to seventh aspects, the control section starts reproduction by the recording medium reproduction unit with a lapse of predetermined time after the lens cover open/close detection sensor detects the state change of the lens cover from close to open.

In the projector of the eighth aspect of the invention, after the open state of the lens cover is detected, the light source is turned on, and with the lapse of predetermined time, reproduction by the recording medium reproduction unit is started. Accordingly, reproduction can be started after the light source becomes stable in operation.

In a ninth aspect of the invention, in the projector of any of the first, third, sixth, and seventh aspects, an imaging unit is further provided for capturing a projection video being a projection result by the projection system. In the projector, the control section turns on the light source after the lens cover open/close detection sensor detects the state change of the lens cover from close to open, and starts reproduction by the recording medium reproduction unit when the projection video captured by the imaging unit shows an illumination of a predetermined value or higher.

In the projector of the ninth aspect of the invention, after the open state of the lens cover is detected, the light source is turned on, and when the projection video shows an illumination of a predetermined value or higher, reproduction by the recording medium reproduction unit is started. Accordingly, reproduction can be started after the brightness of the projection video reaches a predetermined value or higher.

In a tenth aspect of the invention, in the projector of any of the fourth, sixth, and seventh aspects, an imaging unit is further provided for capturing a projection video being a projection result by the projection system. In the projector, the control section increases the amount of the light of the light source after the lens cover open/close detection sensor detects the state change of the lens cover from close to open, and starts reproduction by the recording medium reproduction unit when the projection video captured by the imaging unit shows an illumination of a predetermined value or higher.

In the projector of the tenth aspect of the invention, after the open state of the lens cover is detected, the amount of light of the light source is increased, and when the projection video shows an illumination of a predetermined value or higher, reproduction by the recording medium reproduction unit is started. Accordingly, reproduction can be started after the brightness of the projection video reaches a predetermined value or higher.

An eleventh aspect of the invention is directed to a method for controlling a projector including a recording medium reproduction unit that reproduces information recorded on a recording medium, and outputs a video signal, and a lens cover that opens and closes the front of a projection lens, and projecting a video light from the projection lens by modulating a light from a light source based on the video signal provided by the recording medium reproduction unit. The method includes: turning off the light source when a state change from open to close of the lens cover is detected, and interrupting reproduction by the recording medium reproduction unit, and turning on the light source when a state change from close to open of the lens cover is detected, and starting reproduction by the recording medium reproduction unit in accordance with predetermined requirements.

In the projector control method of the eleventh aspect of the invention, when a state change from open to close of the lens cover is detected, the light source is turned off, and reproduction by the recording medium reproduction unit is interrupted. When a state change from close to open of the lens cover is detected, the light source is turned on, and reproduction by the recording medium reproduction unit is started in accordance with predetermined requirements. This thus favorably eliminates any complicated operation for turning on or off the light source, and for interrupting or starting again reproduction by the recording medium reproduction unit, thereby improving the operational convenience.

A twelfth aspect of the invention is directed to a method for controlling a projector including a recording medium reproduction unit that reproduces information recorded on a recording medium, and outputs a video signal, and a lens cover that opens and closes the front of a projection lens, and projecting a video light from the projection lens by modulating a light from a light source based on the video signal provided by the recording medium reproduction unit. The method includes: interrupting reproduction by the recording medium reproduction unit when a state change from open to close of the lens cover is detected, and starting reproduction by the recording medium reproduction unit in accordance with predetermined requirements when a state change of from close to open of the lens cover is detected.

In the projector control method of the twelfth aspect of the invention, when a state change from open to close of the lens cover is detected, reproduction by the recording medium reproduction unit is interrupted, and when a state change from close to open of the lens cover is detected, reproduction by the recording medium reproduction unit is started in accordance with predetermined requirements. This thus favorably eliminates any complicated operation for turning on or off the light source, and for interrupting or starting again reproduction by the recording medium reproduction unit, thereby improving the operational convenience.

In a thirteenth aspect of the invention, in the projector control method of the twelfth aspect, in the interrupting, an amount of the light of the light source is reduced, and reproduction by the recording medium reproduction unit is interrupted, and in the starting, the amount of the light of the light source is increased, and reproduction by the recording medium reproduction unit is started.

In the projector control method of the thirteenth aspect of the invention, when a state change from open to close of the lens cover is detected, the amount of light of the light source is reduced, and when a state change from close to open of the lens cover is detected, the amount of the light of the light source is increased. Accordingly, when the lens cover is opened, the amount of light of the light source can be increased in a short time.

In a fourteenth aspect of the invention, in the projector control method of the twelfth aspect, in the interrupting, the light of the light source is modulated in such a manner that an amount of the light from the projection lens falls below a predetermined value, and reproduction by the recording medium reproduction unit is interrupted, and in the starting, the light from the light source is modulated based on the video signal, and reproduction by the recording medium reproduction unit is started.

In the projector control method of the fourteenth aspect of the invention, when a state change from open to close of the lens cover is detected, the amount of light coming from the projection lens is made to fall below a predetermined value. When a state change from close to open of the lens cover is detected, a video light as a result of modulation based on a video signal is emitted. Accordingly, when the lens cover is closed, the amount of light from the light source can be reduced for exposure to the lens cover, thereby preventing the lens cover from being excessively heated.

BRIEF DESCRIPTION OF THE DRAWINGS

The invention will be described with reference to the accompanying drawings, wherein like numbers reference like elements.

FIGS. 2A and 2B are each a schematic diagram showing the external appearance of the projector of the first embodiment.

DESCRIPTION OF EXEMPLARY EMBODIMENTS

First Embodiment

Figure 1:
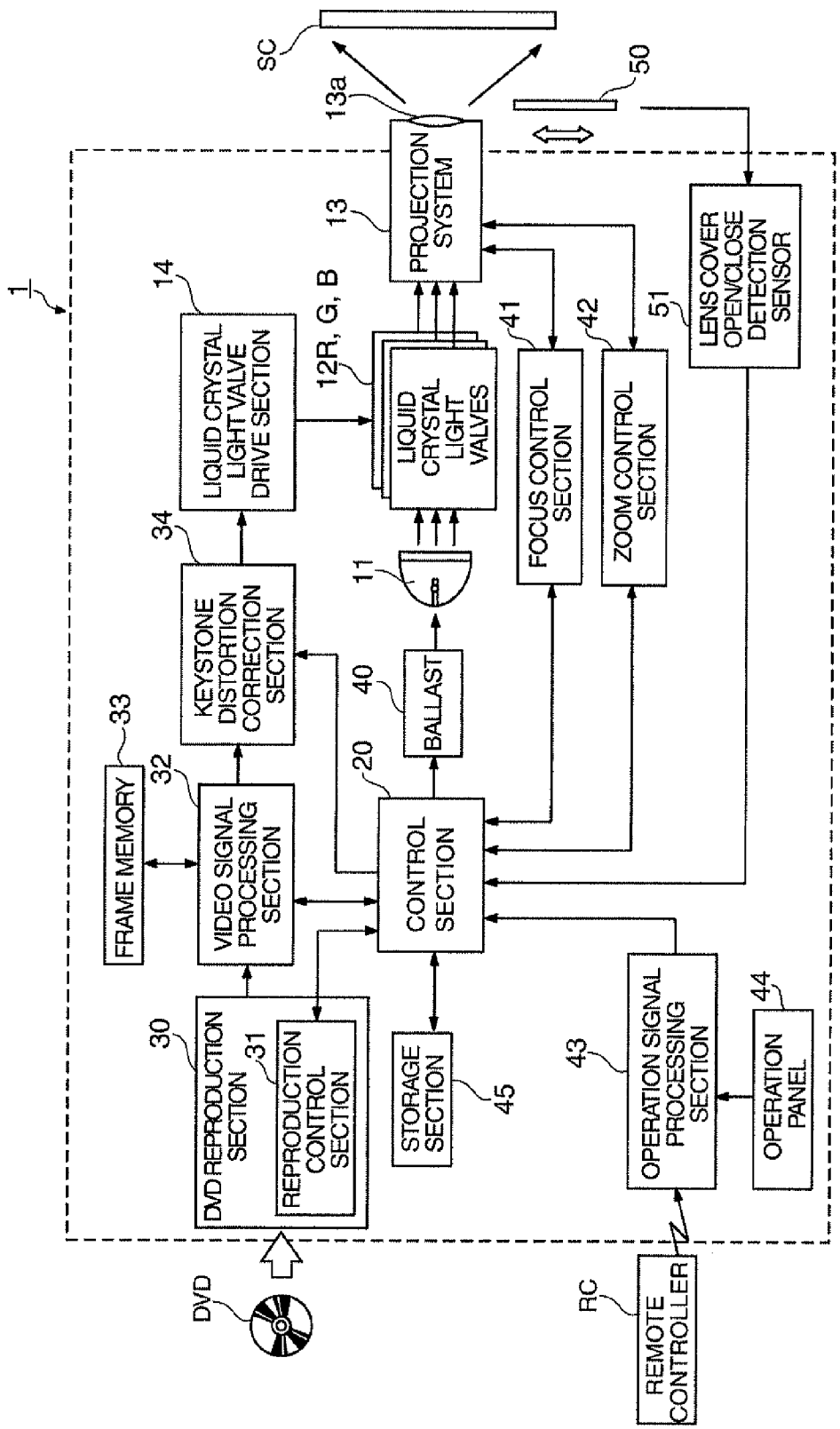
FIG. 1 is a block diagram showing the configuration of a projector of a first embodiment.

FIG. 1 is a block diagram showing the configuration of a projector of a first embodiment. As shown in the drawing, a projector 1 is configured to include a lamp (light source) 11, liquid crystal light valves (light modulation units) 12R, 12G, and 12B, a projection system 13, a liquid crystal light valve drive section 14, a control section 20, a DVD reproduction section (recording medium reproduction unit) 30, a video signal processing section 32, a frame memory 33, a keystone distortion correction section 34, a ballast (light-on/off unit) 40, a focus control section 41, a zoom control section 42, an operation signal processing section 43, an operation panel 44, a storage section 45, a lens cover 50, and a lens cover open/close detection sensor 51. In the below, the liquid crystal light valves 12R, 12G, 12B are collectively referred to as "liquid crystal light valves 12" when no distinction thereamong is required. Herein, the lens cover open/close detection sensor 51 detects the open/close state of the lens cover 50. The DVD reproduction section 30 includes a reproduction control section 31, and the projection system 13 includes a projection lens 13a. In such a projector 1, a video light corresponding to an input video signal coming from the DVD reproduction section 30 is directed for magnification projection onto an object such as screen, white wall, or white board. Such an object is hereinafter referred to as "screen SC".

Note that, in this embodiment, described is a case where a light source is the lamp 11, but this is surely not restrictive, and the light source may be arbitrary, e.g., light-emitting diode or laser diode.

The control section 20 is connected to the other components in the projector 1, i.e., the video signal processing section 32, the keystone distortion correction section 34, the ballast 40, the focus control section 41, the zoom control section 42, the operation signal processing section 43, the storage section 45, and the lens cover open/close detection sensor 51, and the reproduction control section 31 of the DVD reproduction section 30. Such a control section 20 is configured by a microprocessor or others, and runs a control program or others stored in the storage section 45. By the program running as such, the control section 20 controls operation of the projector 1 in its entirety, and computes various types of data coming from the components connected to the control section 20. The computation results are output to the respective components. Moreover, by operating as will be described later, the control section 20 controls operation of the DVD reproduction section 30 based on an operation signal coming from the operation signal processing section 43, and a detection result of the lens cover open/close detection sensor 51.

The DVD reproduction section 30 is formed with an insertion port (not shown), through which a DVD, i.e., recording medium, is inserted for reproduction of information recorded on the DVD. A video signal is then output to the video signal processing section 32. The DVD reproduction section 30 is under the control of the reproduction control section 31, and various types of operations related to reproduction of a DVD are controlled thereby, e.g., reproduction, pause, stop, fast forward/reverse playback, skip, and DVD menu display. This DVD reproduction section 30 has a reproduction resume function with which, when reproduction is stopped halfway or when the power is turned off, information about time of stop and track information are stored in a memory, for example, and at the time when reproduction is started again, the information in the memory is referred to so that reproduction can be resumed from the point at which reproduction was stopped last time.

In the first embodiment, described is a case of reproducing a DVD as a recording medium, but this is surely not restrictive, and the invention can be embodied to reproduce an arbitrary recording medium, e.g., video tape, CD (Compact Disc), HD DVD (High Definition DVD), and Blu-ray Disc. With such configuration, the invention can provide the projector 1 including a device capable of reproducing a wide range of images and audio. Note here that "HD DVD" is the registered trademark of the DVD Format/Logo Licensing Corporation, and "Blu-ray Disc" is the registered trademark of Sony Corporation.

The video signal processing section 32 is configured by a signal processing circuit such as microprocessor, e.g., DSP (Digital Signal Processor), and performs various types of processing by running a control program stored in the storage section provided therein. The video signal processing section 32 is connected with a frame memory 33, and has a function of making the frame memory 33 store video signals from the DVD reproduction section 30 on a frame (video screen) basis, and reading videos (hereinafter, also referred to as "frame videos") stored in the frame memory 33. The video signal processing section 32 also performs various types of signal processing, e.g., resolution conversion of adjusting the resolution of video signals to be the same as that of the liquid crystal light valves 12, and generates projection-video-use video signals.

The video signal processing section 32 also has a function of performing OSD (On-Screen Display) processing in accordance with a control command coming from the control section 20, i.e., combine OSD video signals with frame video signals. The OSD video signals are those of characters and symbols representing various states of the projector 1, and a menu video for image quality adjustment. To be specific, the control section 20 reads menu video data or others from the storage section 45 for supply to the video signal processing section 32, for example, and the video signal processing section 32 generates an OSD video signal using the menu video data. The resulting OSD video signal is then combined with the frame video signal. When such OSD processing is not performed, the frame video signal is output as it is. When a menu image is displayed as a result of such OSD processing, in accordance with the menu image, a user accordingly sets or adjusts the function of the respective components in the projector 1.

The keystone distortion correction section 34 makes a correction to incoming video signals for the purpose of suppressing any keystone distortion possibly caused by projection with the projector 1 tilted against the screen SC, i.e., look-up projection. The resulting corrected video signals are output to the liquid crystal light valve drive section 14. When no keystone distortion is observed, such a correction is not made, and thus the video signals coming from the video signal processing section 32 are forwarded to the liquid crystal light valve drive section 14 as they are.

The liquid crystal light valve drive section 14 drives the liquid crystal light valves 12R, 12G, and 12B in accordance with thus provided video signals. The liquid crystal light valves 12R, 12G, and 12B each include a plurality of pixels (not shown) arranged in a matrix. These pixels are adjusted in transmittance by the liquid crystal light valve drive section 14, whereby the liquid crystal light valves 12R, 12G, and 12B respectively modulate color lights of R (red), G (green), and B (blue) as a result of separating lights coming from the lamp 11 by a color light separation system (not shown). Video lights coming from the liquid crystal light valves 12R, 12G, and 12B are combined together by a combination system such as cross dichroic prism (not shown), and the combination results are magnified and projected onto the screen SC by the projection lens 13a of the projection system 13. The projection system 13 is provided with a focus mechanism that can change a focal point of projection lights, and a zoom mechanism that can change a magnification of the projection lights.

The ballast 40 is a light-on/off unit that turns on or off the lamp 11 in accordance with a command coming from the control section 20. When the lamp 11 is a high-pressure discharge lamp, the ballast 40 is configured by a light-on circuit that applies a starting voltage, or a ballast that supplies an appropriate lamp current.

The focus control section 41 moves a focus lens configuring the focus mechanism of the projection system 13 in the direction of an optical axis in accordance with a command coming from the control section 20, thereby being able to adjust the focus state thereof. The focus control section 41 also can detect the amount of focus adjustment, i.e., movement amount of the focus lens (amount of focus), and can output the detected amount of focus to the control section 20. For detection of the amount of focus, possibly used is a detection mechanism such as rotary encoder and potensiometer detecting the rotation amount of a rotation cam mechanism (not shown) that is used to move the focus lens in the optical-axis direction. Alternatively, the amount of focus may be detected based on the number of steps of a stepping motor that is a drive source of the focus mechanism.

The zoom control section 42 changes the focal distance by moving a zoom lens configuring the zoom mechanism of the projection system 13 in the optical-axis direction in accordance with a command coming from the control section 20, thereby being able to change the magnification of videos displayed on the screen SC. The zoom control section 42 can function also as a zoom amount detection section that detects the focal distance, i.e., movement amount of the zoom lens (amount of zoom), and can output the detected amount of zoom to the control section 20. For detecting the amount of zoom, similarly to the manner of detecting the amount of focus, possibly used is a detection mechanism such as rotary encoder and potensiometer detecting the rotation amount of a rotation cam mechanism (not shown) that is used to move the zoom lens in the optical-axis direction, or the number of steps of a stepping motor that is a drive source of the zoom mechanism may be used as a basis.

The operation panel 44 is provided with operation keys related to a DVD reproduction operation, and various types of switches for state change of the projector 1, for example. The operation keys includes a power ON/OFF key, a reproduction key, a pause key, a stop key, a menu key, a volume key, a skip key, and others, and the switches include a keystone correction key, an input switching key, and others. The keystone correction key is in charge of an operation corresponding to the correction direction of the keystone distortion. The operation panel 44 outputs an operation signal corresponding to the user's key operation to the operation signal processing section 43.

Similarly to the operation panel 44 as such, a remote controller RC is provided with various types of switches, and outputs an operation signal corresponding to the user's key operation to the operation signal processing section 43. The operation signal processing section 43 receives the operation signal provided by the operation panel 44 or the remote controller RC, and forwards the signal to the control signal 20.

The storage section 45 stores a control program to be run by the control section 20, a menu video for use with image quality adjustment or others, OSD information for generating an OSD video, e.g., display of the correction amount of keystone distortion, and others. The storage section 45 also stores various setting values of the projector 1.

FIGS. 2A and 2B are each a schematic diagram showing the external appearance of the projector of the first embodiment. Specifically, FIG. 2A is a diagram showing the state in which the lens cover 50 is open, and FIG. 2B is a diagram showing the state in which the lens cover 50 is closed. As shown in FIGS. 2A and 2B, the chassis of the projector 1 is provided with the lens cover 50 that is moved to slide in the lateral direction manually by a user, thereby opening/closing the front of the projection lens 13a. This lens cover 50 opens the front of the projection lens 13a during video projection as shown in FIG. 2A, and closes the front of the projection lens 13a when the projector is not in use or when no reproduction is in progress as shown in FIG. 2B so that the projection lens 13a can be protected from dust and damage.

The projector 1 is provided also with the lens cover open/close detection sensor 51 that detects the open/close state of the lens cover 50. The lens cover open/close detection sensor 51 is configured by a contact switch or others, and when the lens cover is in the open state (FIG. 2A), the contact switch is turned on so that the lens cover 50 is detected as being open (hereinafter, referred to as "lens cover open"). When the lens cover is in the close state (FIG. 2B), the contact switch is turned off so that the lens cover 50 is detected as being closed (hereinafter, referred to as "lens cover close"). Herein, the lens cover open/close detection sensor 51 is not restrictive to such a mechanical contact switch, and as long as it detects the open/close state of the lens cover 50, may be the one performing such a detection electrically or optically.

In the first embodiment, exemplified is a case of using the lens cover 50 of a slide type, but this is surely not restrictive, and the lens cover 50 may be of any type as long as it opens/closes the front of the projection lens 13a, e.g., detachable lens cap. If this is the case, the lens cover open/close detection sensor 51 is so configured as to detect attachment/removal of the lens cap.

The projector 1 of such a configuration operates as below, and magnifies and projects videos onto the screen SC through reproduction of information recorded on a DVD.

First of all, a user operates the power-ON key of the operation panel 44 or that of the remote controller RC to turn on the projector 1. The user then inserts any desired DVD into the DVD reproduction section 30, manually opens the lens cover 50, and operates the reproduction key, the menu key, and others. In response thereto, the control section 20 is provided with a detection signal of "lens cover opened" from the lens cover open/close detection sensor 51, and an operation signal corresponding to the key operation from the operation signal processing section 43. In accordance with thus provided operation signal, the control section 20 issues a command to the reproduction control section 31 of the DVD reproduction section 30 to reproduce the DVD, for example.

The reproduction control section 31 reproduces the DVD by following the command from the control section 20, and forwards the video signal to the video signal processing section 32. The video signal processing section 32 generates a projection-video-use video signal by converting the provided video signal, and forwards the resulting video signal to the liquid crystal light valve drive section 14. The liquid crystal light valve drive section 14 drives the liquid crystal light valves 12 in accordance with thus provided video signal. By the liquid crystal light valve drive section 14 adjusting the transmittance of the pixels, the liquid crystal light valves 12 each modulate a light coming from the lamp 11, and emit a resulting video light. The video lights are directed onto the screen SC via the projection system 13, and videos corresponding to the input video signal are magnified and projected on the screen SC.

During video projection onto the screen SC through reproduction of the DVD by such an operation, when the user temporarily stops his or her DVD viewing, the lens cover 50 is closed by the user's operation, and when the user starts again his or her DVD viewing, the lens cover 50 is opened by the user's operation.

In the below, by referring to FIGS. 3 and 4, described is an operation in the first embodiment, i.e., an operation of controlling operation of the lamp 11 and that of the DVD reproduction section 30 in accordance with the open/close state of the lens cover 50.

Figure 3:
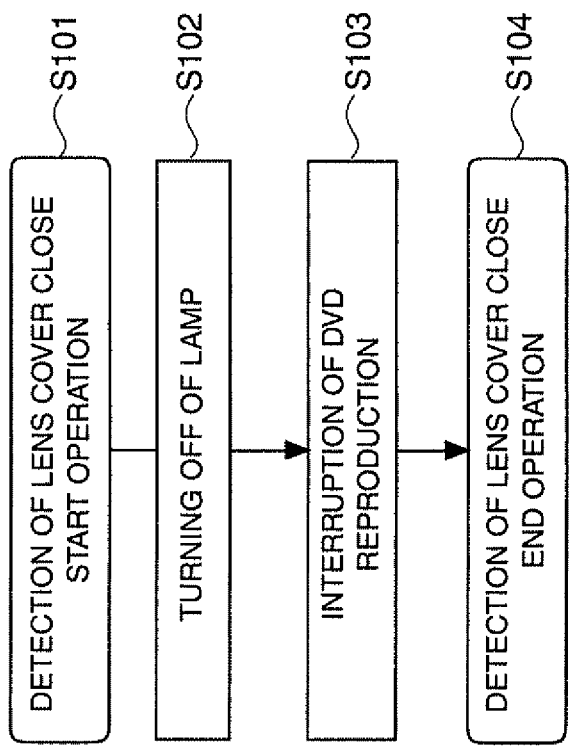
FIG. 3 is an operation flowchart when a lens cover is closed in the projector of the first embodiment.

FIG. 3 is an operation flowchart when the lens cover of the first embodiment is closed.

First of all, by referring to FIG. 3, described is an operation when the lens cover 50 is closed during reproduction of a DVD.

When a user closes the lens cover 50, the control section 20 is provided with a detection signal of "lens cover closed" from the lens cover open/close detection sensor 51. When detecting any state change of the lens cover 50 by the detection signal, i.e., from open to close, (S101), the control section 20 issues a command to the ballast 40 to turn off the lamp 11, and the ballast 40 accordingly turns off the lamp 11 (S102). The control section 20 then issues a command to the reproduction control section 31 to pause reproduction of the DVD. The reproduction control section 31 then interrupts reproduction of the DVD based on the command provided by the control section 20 (S103).

Herein, the command for pausing reproduction is surely not the only option, and the command for stopping reproduction will also do, or reproduction may be interrupted by turning off the power. Moreover, the user setting may select any of the commands for pausing, stopping, or turning off the power, for example. When reproduction is stopped or interrupted by power off, the reproduction control section 31 stores, in a memory, information about time of stop, track information, and others.

Figure 4:
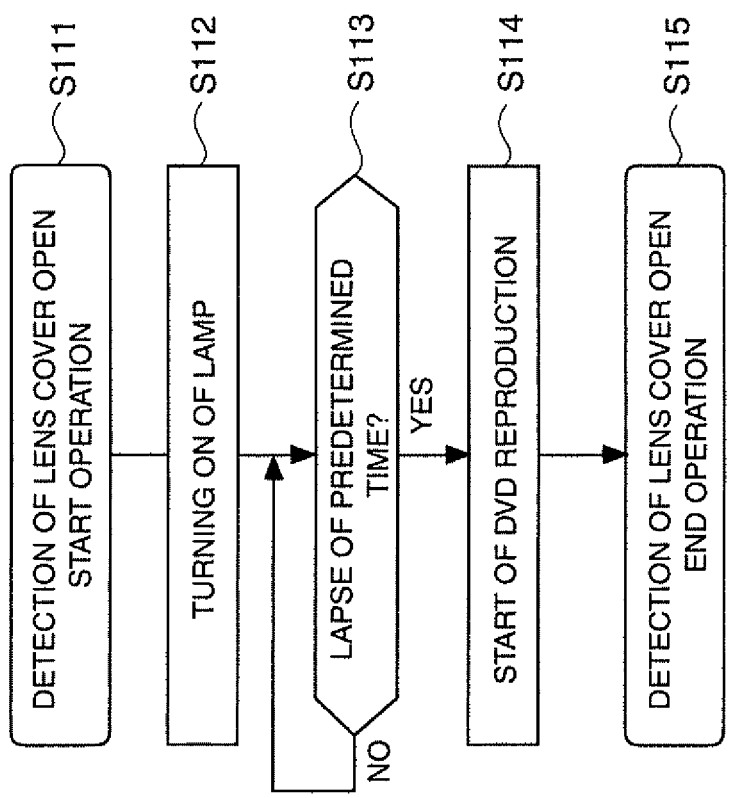
FIG. 4 is an operation flowchart when the lens cover is opened in the projector of the first embodiment.

FIG. 4 is an operation flowchart when the lens cover of the first embodiment is opened.

By referring to FIG. 4, described next is an operation when the lens cover 50 is opened after reproduction is interrupted as above.

When a user opens the lens cover 50, the control section 20 is provided with a detection signal of "lens cover opened" from the lens cover open/close detection sensor 51. When detecting any state change of the lens cover 50 by the detection signal, i.e., from close to open, (S111), the control section issues a command to the ballast 40 to turn on the lamp 11, and the ballast 40 accordingly turns on the lamp 11 (S112). The control section 20 then determines whether a predetermined length of time has passed after the lamp 11 was turned on (S113). This predetermined length of time can be set in accordance with the type of the lamp 11 or others, e.g., a time until a predetermined amount of luminous fluxes are emitted after the lamp 11 was turned on again.

When determining that the predetermined length of time has been passed after the lamp 11 was turned on, the control section 20 issues a command to the reproduction control section 31 to start reproduction of a DVD. Based on such a command coming from the control section 20, the reproduction control section 31 clears the pause, and starts reproduction of the DVD (S114).

Herein, when reproduction has been stopped or interrupted by power off, the reproduction control section 31 refers to the information stored at the time of reproduction stop or power off, and resumes reproduction from the point at which reproduction was stopped or interrupted last time, i.e., resume reproduction.

Note that, in the above, the control section 20 issues a command for starting reproduction of a DVD with the lapse of predetermined time after the lamp 11 is turned on. This is surely not restrictive, and reproduction of the DVD may be started when the predetermined length of time is zero, i.e., immediately after the lamp 11 is turned on.

As described above, in the first embodiment, when the lens cover 50 is closed, the lamp 11 is turned off so that reproduction of a DVD is interrupted, and when the lens cover 50 is opened, the lamp 11 is turned on so that reproduction of the DVD is started again. As such, without any complicated operation, the lamp 11 can be turned on or off, and DVD reproduction can be interrupted or started again, thereby being able to improve the operational convenience. That is, only one operation such as closing the lens cover 50 can turn off the lamp 11, close the lens cover 50, and interrupt DVD reproduction in progress, and only one operation such as opening the lens cover 50 can turn on the lamp 11, open the lens cover 50, and start DVD reproduction.

Moreover, because opening/closing the lens cover 50 can turn on/off the lamp 11, and interrupt or start again DVD reproduction, the operation can be intuitively performed with relative ease compared with button operations such as operation keys.

Further, after the lamp 11 is turned on, DVD reproduction is started again after the lapse of predetermined time so that reproduction can be started after the lamp 11 is stably turned on.

Still further, DVD reproduction is interrupted by a pause, and is started again by the pause being cleared, thereby being able to start again reproduction from the point at which reproduction was interrupted last time.

Still further, DVD reproduction is stopped or interrupted by turning off the power, and is started again using the resume reproduction function, thereby being able to resume reproduction from the point at which reproduction was stopped or interrupted last time.

Second Embodiment

Figure 5:
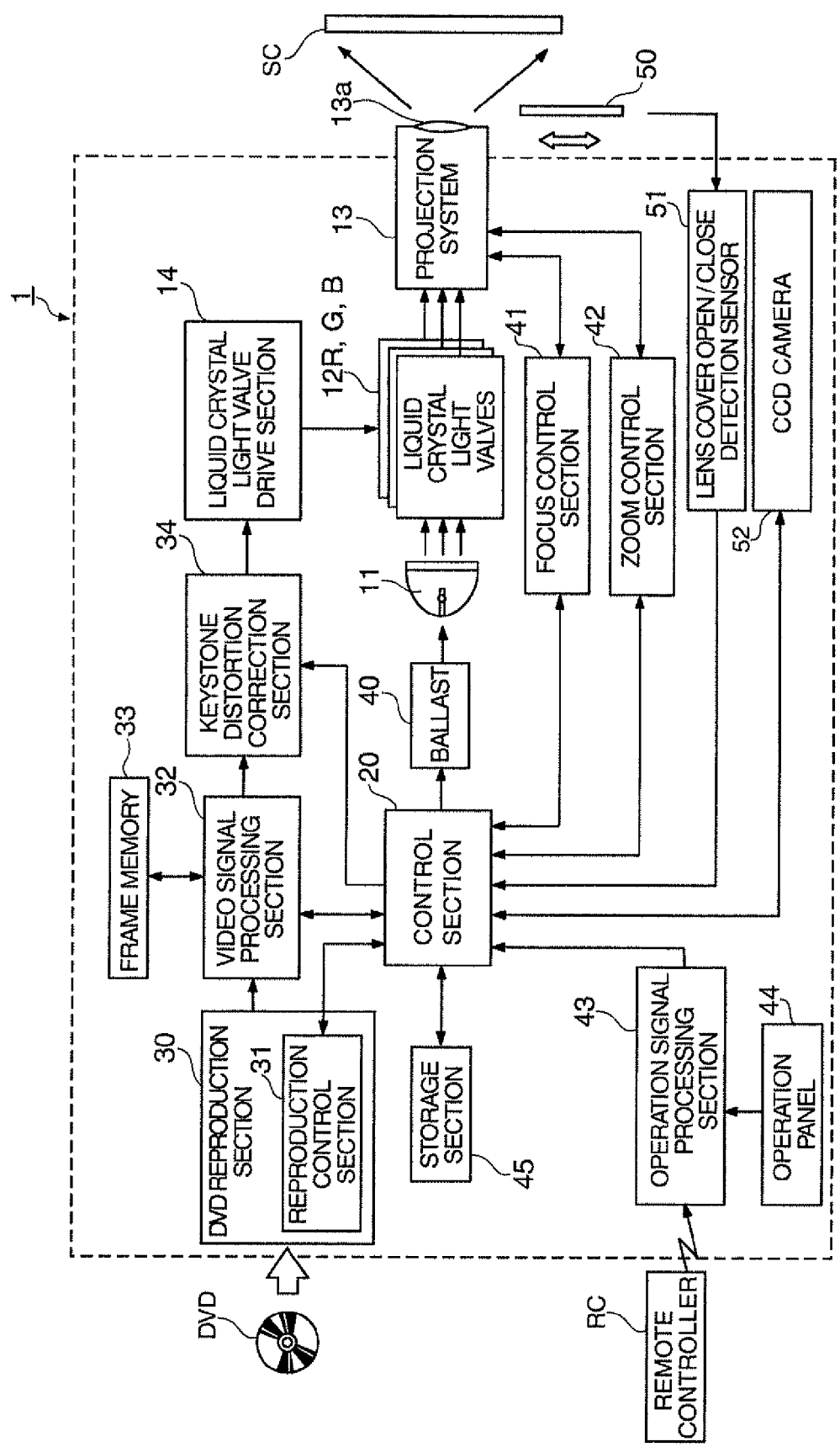
FIG. 5 is a block diagram showing the configuration of a projector of a second embodiment.

FIG. 5 is a block diagram showing the configuration of a projector of a second embodiment.

The projector 1 in this second embodiment is provided with, in addition to the configuration of the first embodiment described above, a CCD (Charge-Coupled Device) camera 52 that is an imaging unit for capturing a projection video projected on the screen SC by the projection system 13.

In the CCD camera 52, a plurality of light-receiving elements (not shown) are arranged in a matrix, and information about an electric signal as a result of photoelectric conversion by these light-receiving elements is output to the control section 20. The remaining configuration and operation are the same as those in the first embodiment, and thus are not described twice.

By referring to FIG. 6, described next is an operation when the lens cover 50 is opened in the second embodiment. Note that the operation when the lens cover 50 is closed during DVD reproduction is the same as that in the first embodiment (FIG. 3).

Figure 6:
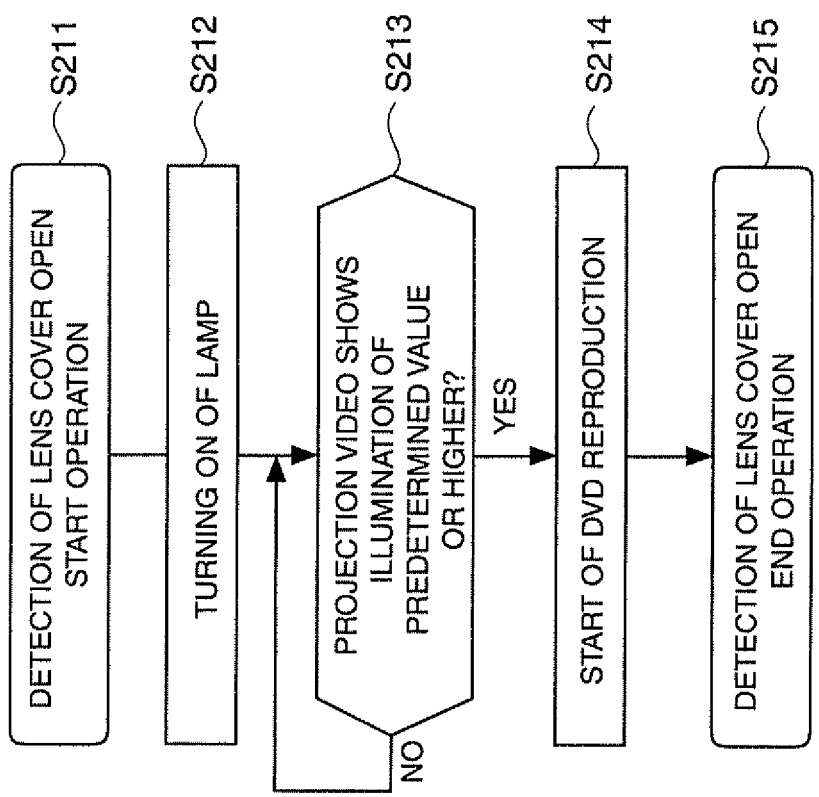
FIG. 6 is an operation flowchart when a lens cover is opened in the projector of the second embodiment.

FIG. 6 is an operation flowchart when the lens cover in the second embodiment is opened.

After reproduction of a DVD is interrupted because the lens cover 50 is closed during the DVD reproduction by the operation similar to that in the first embodiment described above, when the lens cover 50 is opened by a user, the control section 20 is provided with a detection signal of "lens cover opened" from the lens cover open/close detection sensor 51. When detecting any state change of the lens cover 50 by the detection signal, i.e., from close to open, (S211), the control section 20 issues a command to the ballast 40 to turn on the lamp 11, and the ballast 40 accordingly turns on the lamp 11 (S212). The light from the lamp 11 is then modulated by the liquid crystal light valves 12, and the resulting lights are projected onto the screen SC by the projection system 13. At this time, when reproduction of the DVD is being interrupted by a pause, a projection video of the video screen during the pause is projected onto the screen SC. When reproduction is stopped or interrupted by power off, a predetermined video screen or a white light as a result of no modulation of the light from the lamp 11 is projected onto the screen SC.

Based on the information about the projection video captured by the CCD camera 52, the control section 20 then determines whether the projection video has the brightness, e.g., illumination, of a predetermined value or higher (S213). When determining that the illumination is of the predetermined value or higher, the control section 20 issues a command to the reproduction control section 31 to start reproduction of the DVD. Based on such a command coming from the control section 20, the reproduction control section 31 clears the pause and starts reproduction of the DVD (S214). Also in the second embodiment, when reproduction is stopped or interrupted due to power off, the reproduction control section 31 refers to the information stored at the time of reproduction stop or power off to resume reproduction from the point at which reproduction was stopped or interrupted last time (resume reproduction).

As such, in the second embodiment, DVD reproduction is started again when the illumination of the projection video captured by the CCD camera 52 reaches a predetermined value or higher. Accordingly, in addition to the effects similar to those in the first embodiment, reproduction can be started when the brightness of the projection video reaches a predetermined value or higher.

Note that, in the first and second embodiments above, described is the case in which, when the lens cover 50 is detected as being opened or closed, the lamp 11 is controllably turned on or off, and DVD reproduction is controllably interrupted or started again. This is surely not restrictive, and only DVD reproduction may be controllably interrupted or started again.

Third Embodiment

In the first or second embodiment above, described is the case of turning on or off the lamp 11. In this third embodiment, described is a case of changing the amount of light of the lamp 11.

The ballast 40 in the third embodiment reduces or increases the amount of light of the lamp 11 in accordance with a command coming from the control section 20. When the lamp 11 is a high-pressure discharge lamp, for example, the light is controllably adjusted by increasing or decreasing a lamp current. Herein, the remaining configuration is the same as that of the first embodiment described above, and any component similar to that in the first embodiment is provided with the same reference numeral, and thus is not described again.

Figure 7:
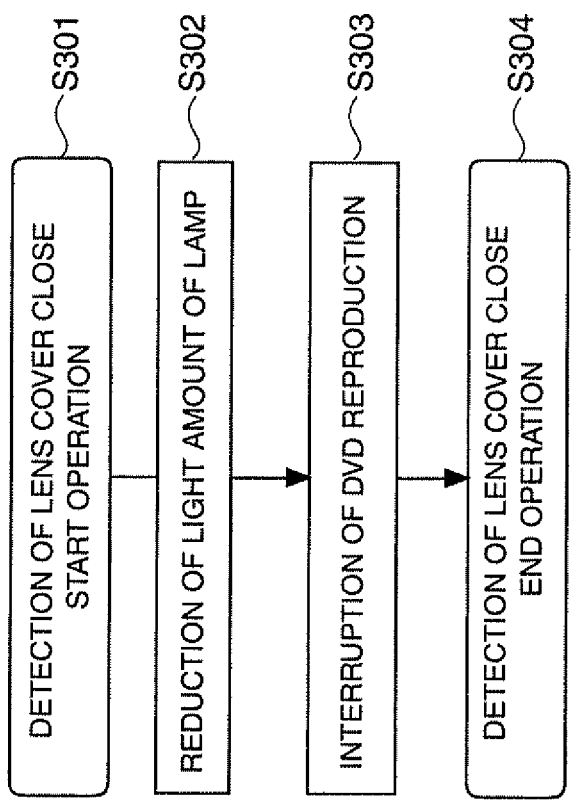
FIG. 7 is an operation flowchart when a lens cover is closed in a projector of a third embodiment.

FIG. 7 is an operation flowchart when the lens cover of the third embodiment is closed.

By referring to FIG. 7, described first is an operation when the lens cover 50 is closed during reproduction of a DVD.

When a user closes the lens cover 50, the control section 20 is provided with a detection signal of "lens cover closed" from the lens cover open/close detection sensor 51. When detecting any state change of the lens cover 50 by the detection signal, i.e., from open to close, (S301), the control section 20 issues a command to the ballast 40 to reduce the amount of light of the lamp 11, and the ballast 40 accordingly reduces the amount of light of the lamp 11 (S302). For such reduction of the amount of light, when the lamp 11 is a high-pressure discharge lamp, for example, the light is so controllably adjusted as to have a minimum necessary lamp current to keep discharge.

The control section 20 then issues a command to the reproduction control section 31 to pause reproduction of the DVD. The reproduction control section 31 then accordingly pauses reproduction of the DVD based on the command provided by the control section 20 (S303).

Herein, the command for pausing reproduction is surely not the only option, and the command for stopping reproduction will also do, or reproduction may be interrupted by turning off the power. Moreover, the user setting may select any of the commands for pausing, stopping, or turning off the power, for example. When reproduction is stopped or interrupted by power off, the reproduction control section 31 stores, in a memory, information about time of stop, track information, and others.

Figure 8:
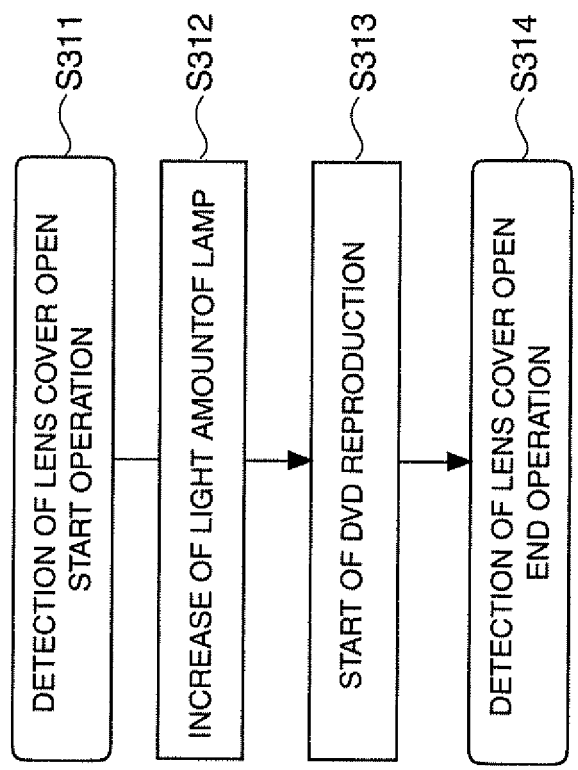
FIG. 8 is an operation flowchart when the lens cover is opened in the projector of the third embodiment.

FIG. 8 is an operation flowchart when the lens cover of the third embodiment is opened.

By referring to FIG. 8, described next is an operation when the lens cover 50 is opened after reproduction is interrupted as above.

When a user opens the lens cover 50, the control section 20 is provided with a detection signal of "lens cover opened" from the lens cover open/close detection sensor 51. When detecting any state change of the lens cover 50 by the detection signal, i.e., from close to open, (S311), the control section issues a command to the ballast 40 to increase the amount of light of the lamp 11, and the ballast 40 accordingly increases the amount of light of the lamp 11 (S312). For such an increase in the amount of light, when the lamp 11 is a high-pressure discharge lamp, for example, the light is so controlled that a lamp current has a rated value.

The control section 20 then issues a command to the reproduction control section 31 to start reproduction of the DVD. Based on such a command coming from the control section 20, the reproduction control section 31 accordingly clears the pause, and starts reproduction of the DVD (S313).

Herein, when reproduction has been stopped or interrupted by power off, the reproduction control section 31 refers to the information stored at the time of reproduction stop or power off, and resumes reproduction from the point at which reproduction was stopped or interrupted last time, i.e., resume reproduction.

Note that, in the above description, the control section 20 starts reproduction of the DVD immediately after issuing the command for increasing the amount of light of the lamp 11. This is surely not restrictive, and the control section 20 may issue a command for starting reproduction of the DVD with the lapse of predetermined time after issuing the command for increasing the amount of light of the lamp 11. If this is the case, reproduction can be started after the lamp 11 is through with light-adjustment control of increasing the amount of light thereof, and becomes stable in light amount, for example. Still alternatively, as described in the second embodiment, the CCD camera 52 being an imaging unit may be provided, and when a projection video captured by the CCD camera 52 has an illumination of a predetermined value or higher, DVD reproduction may be started again. If this is the case, reproduction can be started when the brightness of the projection video reaches a predetermined value or higher.

As such, in the third embodiment, the amount of light of the lamp 11 is reduced or increased through the open/close operation of the lens cover 50. Accordingly, in addition to the effects similar to those in the first embodiment, compared with a case of turning off the lamp 11 and then turning it on again, the amount of light of the lamp 11 can be increased in a short time after the lamp cover 50 is opened.

Moreover, because the frequency of turning on and off the lamp 11 can be reduced, when the lamp 11 is a high-pressure discharge lamp, the load at the time of lamp startup can be reduced so that the life of the lamp can be favorably increased.

Fourth Embodiment

In a fourth embodiment, described is a case of changing the amount of light coming from the projection system 13. Herein, the configuration of the projector 1 in this embodiment is the same as that of the first embodiment, and any component similar to that in the first embodiment is provided with the same reference numeral, and thus is not described again.

Figure 9:
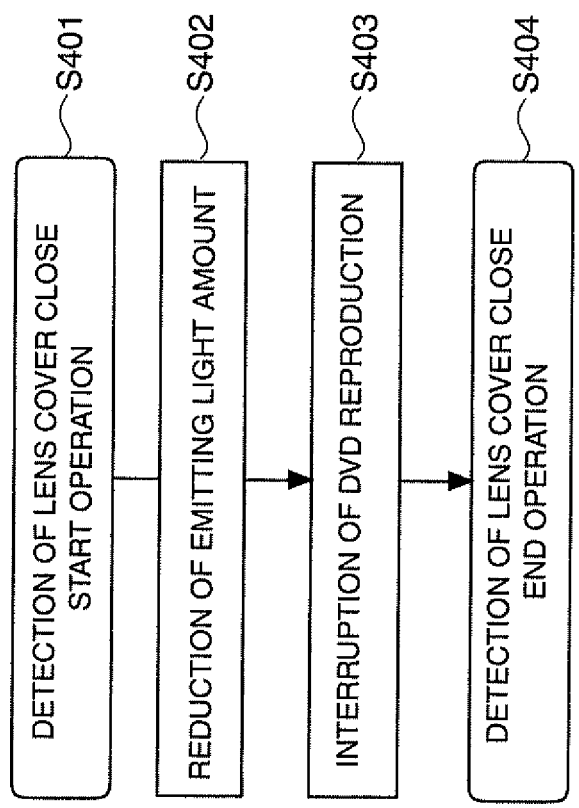
FIG. 9 is an operation flowchart when a lens cover is closed in a projector of a fourth embodiment.

FIG. 9 is an operation flowchart when a lens cover of the fourth embodiment is closed.

By referring to FIG. 9, described first is an operation when the lens cover 50 is closed during reproduction of a DVD.

When a user closes the lens cover 50, the control section 20 is provided with a detection signal of "lens cover closed" from the lens cover open/close detection sensor 51. When detecting any state change of the lens cover 50 by the detection signal, i.e., from open to close, (S401), the control section 20 modulates a light from the lamp 11 in such a manner that the amount of light from the projection system 13 falls below a predetermined value (S402). For modulation as such, the liquid crystal light valve drive section 14 is provided with, via the video signal processing section 32, a frame video, e.g., black screen, with which the pixels of each of the liquid crystal light valves 12 show the minimum transmittance. Herein, the manner of modulation is not restrictive thereto, and any will do as long as the light from the projection system 13 is reduced in amount, e.g., the light from the lamp 11 may be at least partially cut off by the liquid crystal light valves 12.

Thereafter, the control section 20 issues a command to the reproduction control section 31 to pause reproduction of the DVD. The reproduction control section 31 then accordingly pauses reproduction of the DVD based on the command provided by the control section 20 (S403).

Herein, the command for pausing reproduction is surely not the only option, and the command for stopping reproduction will also do, or reproduction may be interrupted by turning off the power. Moreover, the user setting may select any of the commands for pausing, stopping, or turning off the power, for example. When reproduction is stopped or interrupted by power off, the reproduction control section 31 stores, in a memory, information about time of stop, track information, and others.

Figure 10:
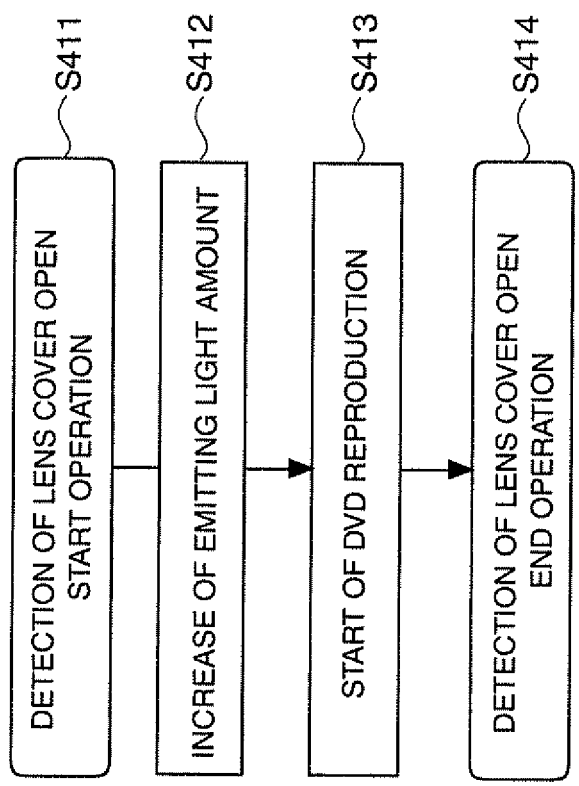
FIG. 10 is an operation flowchart when the lens cover is opened in the projector of the fourth embodiment.

FIG. 10 is an operation flowchart when the lens cover of the fourth embodiment is opened.

By referring to FIG. 10, described next is an operation when the lens cover 50 is opened after reproduction is interrupted as above.

When a user opens the lens cover 50, the control section 20 is provided with a detection signal of "lens cover opened" from the lens cover open/close detection sensor 51. When detecting any state change of the lens cover 50 by the detection signal, i.e., from close to open, (S411), the control section 20 makes the liquid crystal light valves 12 modulate a light from the lamp 11 based on a video signal (S412). That is, the video signal processing section 32 generates a projection-video-use video signal by converting an input video signal, and the resulting video signal is supplied to the liquid crystal light valve drive section 14. The liquid crystal light valve drive section 14 then drives the liquid crystal light valves 12 in accordance with the input video signal. As a result, a video corresponding to the input video signal is magnified and projected on the screen SC via the projection system 13.

Thereafter, the control section 20 issues a command to the reproduction control section 31 to start DVD reproduction. The reproduction control section 31 then accordingly clears the pause and starts reproduction of the DVD based on the command provided by the control section 20 (S413).

Herein, when reproduction has been stopped or interrupted by power off, the reproduction control section 31 refers to the information stored at the time of reproduction stop or power off, and resumes reproduction from the point at which reproduction was stopped or interrupted last time, i.e., resume reproduction.

As described above, in the fourth embodiment, when the lens cover 50 is closed, a light from the lamp 11 is so modulated that the amount of light from the projection system 13 falls below a predetermined value. Accordingly, in addition to the effects similar to those in the first embodiment, the amount of light from the lamp 11 can be reduced for exposure to the lens cover 50, thereby favorably preventing the lens cover 50 from being excessively heated.

Moreover, there is no need to go through a control operation for turning on or off the lamp 11, or for increasing or reducing the amount of light. Accordingly, when the lens cover is opened, DVD reproduction can be resumed in a short time.

Further, because the frequency of turning on and off the lamp 11 can be reduced, when the lamp 11 is a high-pressure discharge lamp, the load at the time of lamp startup can be reduced so that the life of the lamp can be favorably increased.

In the first to fourth embodiments above, described is the case of modulating a light from the lamp 11 using the liquid crystal light valves 12. This is surely not restrictive, and a spatial light modulator of any other type may be used, e.g., DMD (Digital Micromirror Device) with which videos are projected by controlling, based on a video signal, the tilt of a micro-size mirror spread over a semiconductor substrate. Herein, "DMD" is the trademark of Texas Instruments Corp.

The entire disclosure of Japanese Patent Application Nos: 2007-281156, filed Oct. 30, 2007 and 2008-134101, filed May 22, 2008 are expressly incorporated by reference herein.

What is claimed is:
1. A projector, comprising:
a light source;
a light-on/off unit that turns on or off the light source;
a recording medium reproduction unit that reproduces information recorded on a recording medium, and outputs a video signal;

a video signal processing section that converts the video signal provided by the recording medium reproduction unit, and generates a video signal for a projection video image;
a light modulation unit that modulates a light coming from the light source based on the video signal generated by the video signal processing section, and emits a resulting video light;
a projection system that includes a projection lens, and magnifies and projects the video light coming from the light modulation unit;
a lens cover that opens and closes the front of the projection lens;
a lens cover open/close detection sensor that detects an open/close state of the lens cover; and
a control section that controls operation of the light-on/off unit and that of the recording medium reproduction unit, the control section being configured to:
(i) turn off the light source, and interrupt reproduction by the recording medium reproduction unit, when the lens cover open/close detection sensor detects a state change of the lens cover from open to close, and
(ii) turn on the light source, and start reproduction by the recording medium reproduction unit (a) after a lapse of predetermined time after the light source is turned on and (b) in accordance with predetermined requirements, when the lens cover open/close detection sensor detects a state change of the lens cover from close to open.

2. A projector, comprising:
a recording medium reproduction unit that reproduces information recorded on a recording medium, and outputs a video signal;
a video signal processing section that converts the video signal provided by the recording medium reproduction unit, and generates a video signal for a projection video image;
a light modulation unit that modulates a light coming from a light source based on the video signal generated by the video signal processing section, and emits a resulting video light;
a projection system that includes a projection lens, and magnifies and projects the video light coming from the light modulation unit;
a lens cover that opens and closes the front of the projection lens;
a lens cover open/close detection sensor that detects an open/close state of the lens cover; and
a control section that controls operation of the recording medium reproduction unit, the control section being configured to:
(i) interrupt reproduction by the recording medium reproduction unit when the lens cover open/close detection sensor detects a state change of the lens cover from open to close, and
(ii) start reproduction by the recording medium reproduction unit after a lapse of predetermined time and in accordance with predetermined requirements after the lens cover open/close detection sensor detects a state change of the lens cover from close to open.

3. The projector according to claim 2, further comprising:
a light source; and
a light-on/off unit that turns on or off the light source, wherein
the control section
turns off the light source when the lens cover open/close detection sensor detects the state change of the lens cover from open to close, and
turns on the light source when the lens cover open/close detection sensor detects the state change of the lens cover from close to open.

4. The projector according to claim 2, further comprising:
a light source; and
a light-on/off unit that controls an amount of a light of the light source, wherein
the control section
reduces the amount of the light of the light source when the lens cover open/close detection sensor detects the state change of the lens cover from open to close, and
increases the amount of the light of the light source when the lens cover open/close detection sensor detects the state change of the lens cover from close to open.

5. The projector according to claim 2, wherein
the control section
makes, when the lens cover open/close detection sensor detects the state change of the lens cover from open to close, the light modulation unit modulate the light from the light source in such a manner that an amount of the light from the projection system falls below a predetermined value, and
makes, when the lens cover open/close detection sensor detects the state change of the lens cover from close to open, the light modulation unit modulate the light from the light source based on the video signal.

6. The projector according to claim 1, wherein
the control section
interrupts, by a pause, reproduction by the recording medium reproduction unit at a point in the reproduction by the recording medium reproduction unit, when the lens cover open/close detection sensor detects the state change of the lens cover from open to close, and
cancels the pause when the lens cover open/close detection sensor detects the state change of the lens cover from close to open, and starts reproduction by the recording medium reproduction unit at the point in the reproduction by the recording medium reproduction unit.

7. The projector according to claim 1, wherein
the recording medium reproduction unit has a reproduction resume function, and
the control section
stops reproduction by the recording medium reproduction unit when the lens cover open/close detection sensor detects the state change of the lens cover from open to close, and
resumes reproduction by the recording medium reproduction unit when the lens cover open/close detection sensor detects the state change of the lens cover from close to open.

8. The projector according to claim 1, further comprising
an imaging unit that captures a projection video image being a projection result by the projection system, wherein
the control section
turns on the light source after the lens cover open/close detection sensor detects the state change of the lens cover from close to open, and starts reproduction by the recording medium reproduction unit when the projection video image captured by the imaging unit shows an illumination of a predetermined value or higher.

9. The projector according to claim 4, further comprising
an imaging unit that captures a projection video image being a projection result by the projection system, wherein
the control section
increases the amount of the light of the light source after the lens cover open/close detection sensor detects the state change of the lens cover from close to open, and starts reproduction by the recording medium reproduction unit when the projection video image captured by the imaging unit shows an illumination of a predetermined value or higher.

10. The projector according to claim 2, wherein
the control section
interrupts, by a pause, reproduction by the recording medium reproduction unit when the lens cover open/close detection sensor detects the state change of the lens cover from open to close, and
cancels the pause when the lens cover open/close detection sensor detects the state change of the lens cover from close to open, and starts reproduction by the recording medium reproduction unit.

11. The projector according to claim 2, wherein
the recording medium reproduction unit has a reproduction resume function, and
the control section
stops reproduction by the recording medium reproduction unit when the lens cover open/close detection sensor detects the state change of the lens cover from open to close, and
resumes reproduction by the recording medium reproduction unit when the lens cover open/close detection sensor detects the state change of the lens cover from close to open.

12. The projector according to claim 3, further comprising
an imaging unit that captures a projection video image being a projection result by the projection system, wherein
the control section
turns on the light source after the lens cover open/close detection sensor detects the state change of the lens cover from close to open, and starts reproduction by the recording medium reproduction unit when the projection video image captured by the imaging unit shows an illumination of a predetermined value or higher.

13. The projector according to claim 6, further comprising
an imaging unit that captures a projection video image being a projection result by the projection system, wherein
the control section
increases the amount of the light of the light source after the lens cover open/close detection sensor detects the state change of the lens cover from close to open, and starts reproduction by the recording medium reproduction unit when the projection video image captured by the imaging unit shows an illumination of a predetermined value or higher.

14. The projector according to claim 1, wherein
the recording medium is a non-volatile recording medium.

* * * * *